J. R. BAKER, M. LOUCKS & W. R. CLARK.
CAR BEARING.
APPLICATION FILED OCT. 3, 1907.
917,522.
Patented Apr. 6, 1909.
2 SHEETS—SHEET 1.
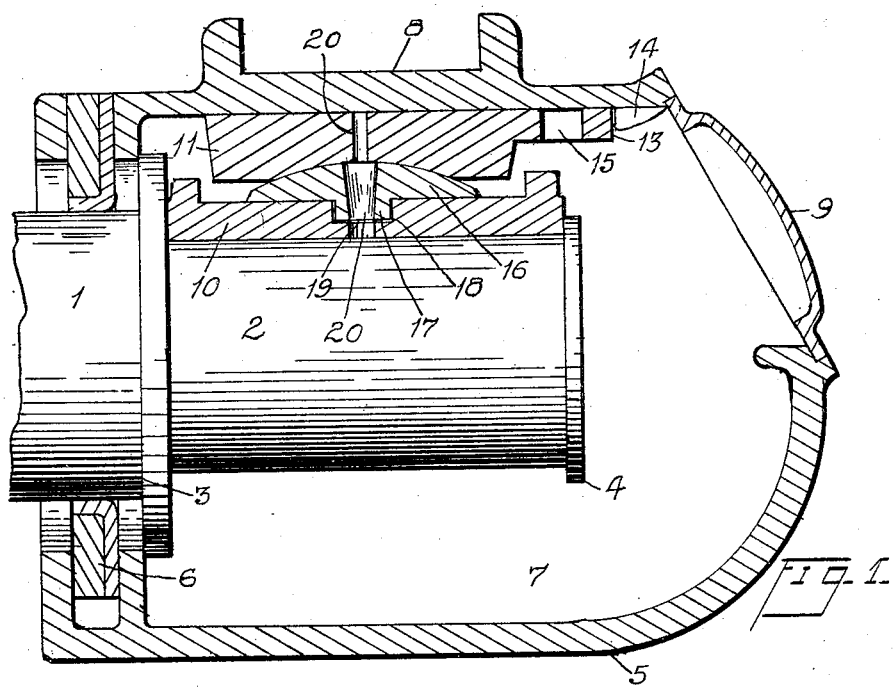
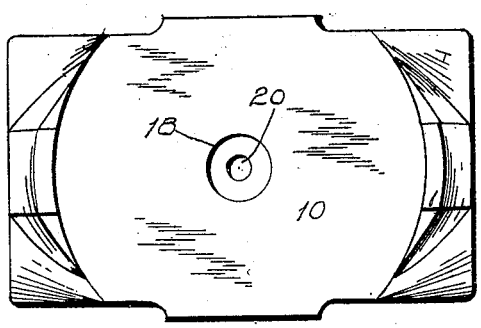
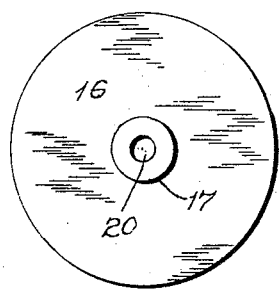
WITNESSES
INVENTORS
Jackson R. Baker
Menzo Loucks
William R. Clark
BY
Russell M. Everett,
ATTORNEY.

J. R. BAKER, M. LOUCKS & W. R. CLARK.
CAR BEARING.
APPLICATION FILED OCT. 3, 1907.
917,522.
Patented Apr. 6, 1909.
2 SHEETS—SHEET 2.
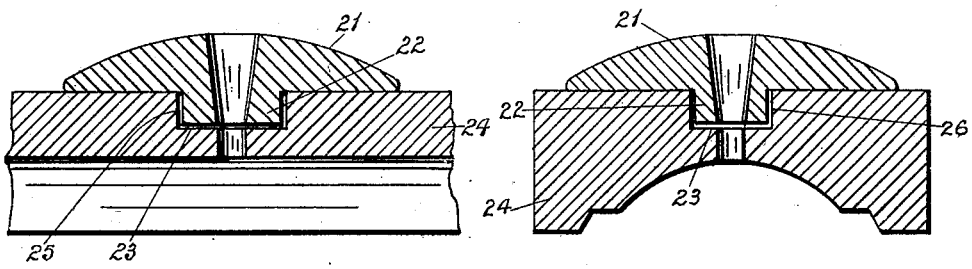
Fig.4.
Fig.5.
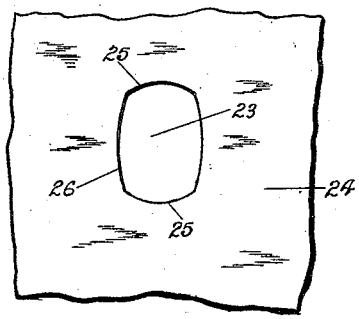
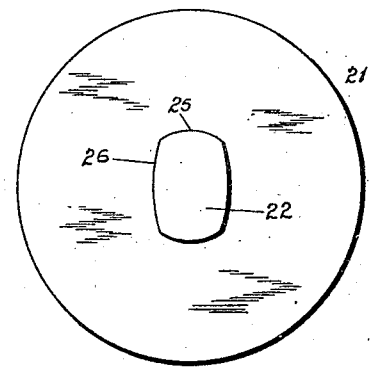
Fig.6.
Fig.7.
WITNESSES
INVENTORS
Jackson R. Baker
Menzo Loucks
William R. Clark,
BY
ATTORNEY.

UNITED STATES PATENT OFFICE.

JACKSON R. BAKER, OF MAPLEWOOD, AND MENZO LOUCKS AND WILLIAM R. CLARK, OF JERSEY CITY, NEW JERSEY; SAID CLARK ASSIGNOR OF ALL HIS RIGHT TO VAN ALSTYNE LOUCKS, OF JERSEY CITY, NEW JERSEY.

CAR-BEARING.

No. 917,522.      Specification of Letters Patent.      Patented April 6, 1909.

Application filed October 3, 1907. Serial No. 395,795.

*To all whom it may concern:*

Be it known that we, JACKSON R. BAKER, MENZO LOUCKS, and WILLIAM R. CLARK, citizens of the United States, residing at Maplewood, in the county of Essex and State of New Jersey, Jersey City, in the county of Hudson and State of New Jersey, and Jersey City, in the county of Hudson and State of New Jersey, respectively, have invented certain Improvements in Car-Bearings, of which the following is a specification.

This invention relates more particularly to the axle bearings of locomotive tenders, passenger equipment, freight cars or the like, and to the means employed between the journal bearing of the axle and the box carrying the load to reduce or overcome the friction therebetween and obviate what is known as hot boxes, as represented by the prior patents of Jackson R. Baker, No. 213,731, issued April 1, 1879, No. 244,107, issued July 12, 1881, No. 370,034 issued September 20, 1887, and No. 572,517, issued December 8, 1896.

The objects of the invention are to secure a greater freedom of movement at the car bearing whereby it may readily accommodate changes of position of the axle with respect to the load carried thereby; to enable the bearing to adjust itself to operate in different positions; to obviate grinding and wear between the flanges of the wheels and the rails of the track, and between the ends of the bearing and the shoulders of the axle; to lessen the danger of displacement of the wheels from their normal relation with respect to the rails, such as the flange of a wheel mounting onto the tread surface of the rail; to thus avoid liability of accident and wrecks and secure greater safety; to enable the improvements to be applied to different kinds of bearings, including those already in use; to reduce friction to the minimum and thus secure an increased saving of power and fuel, and to obtain other advantages and results as may be brought out in the following description.

Referring to the accompanying drawings in which like numerals of reference indicate corresponding parts in each of the several figures; Figure 1 is a vertical longitudinal section of a car bearing of our improved construction; Fig. 2 is a plan of the saddle of the bearing, and Fig. 3 is a reverse plan or underneath view of the bearing disk removed from said saddle; Fig. 4 is a central vertical section of the bearing disk and a portion of the saddle, taken longitudinally of the axle, showing a slightly modified construction, and Fig. 5 is a similar section taken transversely of the axle; Fig. 6 is a plan view of a portion of the saddle, illustrating said modified construction, and Fig. 7 is a reverse plan of the bearing disk removed from said saddle.

In said drawings, 1 indicates a car axle having the journal 2, shoulder 3 and end collar 4, all said parts being of any usual and ordinary construction.

The journal of the axle, and bearing about to be described, are inclosed by a box or housing 5 of any suitable type commonly employed and which at its upper part lies between the bearing and the load carried thereby. This box 5 has at its inner end, as at 6, suitable dust guard means, and at its lower part 7 serves to contain the waste and oil for lubricating the journal; the top of the box provides a seat 8 for receiving the equalizing bar of the truck, and at the outer end of the box is a door or cap 9 providing access to the interior thereof.

Upon the journal 2 of the axle is arranged a saddle 10 which in length reaches between the shoulder 3 and collar 4, and circumferentially extends one-third more or less of the distance around the journal. Above the said saddle, and against the top or interior wall of the box, is arranged a key 11, which is preferably flat on top to fit against the box and has at its sides and outer end shoulders, marked 13, at the end, to engage corresponding projections upon the box and hold the key in place with respect thereto, one of said projections adapted to engage the shoulder 13 being shown at 14. This key is removed and inserted through the door 9, when the load is raised, by means of an opening or hold 15 at its outer end. The key 11 has at its under side a spherical concavity, and upon the top of the saddle 10 is a disk with a corresponding spherically convex top adapted to fit into said concavity in the key. The bottom of the said disk has a flat bearing surface which engages in a substantially horizontal plane a flat portion of the top of the saddle, and preferably this said engagement of the disk and saddle permits a relative sliding in any direction in said plane, means being provided for suitably limiting such sliding. This improved construction not only enables the rocking motion which has been a feature of the earlier inventions above referred to, but also enables the bearing to adjust itself within certain limits in a horizontal plane. The result is that instead of having to raise the entire load when the key tends to slide up the rounded surface of the disk, the disk can simply shift its position slightly and adjust itself as is required.

In Figs. 1, 2 and 3, a bearing disk 16 is shown which rests flat at its lower side upon the saddle 10 and is provided with a round central projection or stem extending into a recess 18 in the saddle. Preferably the end of this stem clears the bottom of its recess sufficiently, as at 19, to insure that the pressure is all between the disk and top of the saddle, and furthermore through the said stem, and also through the entire disk and the saddle, extends an oil hole 20. The key 11 has in its lower surface a concavity to receive the top of said disk 16.

In Figs. 4, 5, 6 and 7, a bearing disk 21 is shown which has a projecting stop 22 which is four-sided and preferably longer in diameter in the direction of the length of the axle bearing. This stop 22 fits into a recess 23 of the saddle 24 and the dimensions of this recess are shown as greater than the corresponding ones of the stop, so that a certain amount of lost motion is permitted. Preferably there is more looseness of fit at the ends of the recess, or in the direction of the length of the axle, as at 25, but there is also a looseness transversely as at 26, if desired. Besides the longitudinal and transverse sliding thus provided for, it will be obvious that the disk 21 can twist or rotate to a limited extent, and a combination of all these movements tends to great flexibility and facility of adjustment in the bearing. It will be understood that with the bearing disk 21 just described, a key with a corresponding crown or concave bearing as shown in Figs. 1 and 2, or any other suitable or appropriate form, may be employed.

It will be noted that the means which we show for limiting movement of the bearing disk upon its saddle, either in a horizontal plane or rotatable, are located between the two contacting faces of said parts and centrally of the disk or inward from its marginal edges. The advantage of this is not only that said limiting means are thus hidden or concealed, but also they are located at the thickest and strongest part of the disk,—that is to say, its middle, the edges of the disk being thin in order to obtain the curvature of the disk with least thickness of it and therefore comparatively weak. Furthermore, the said location of the recess and projection facilitates the access of oil through the oil holes shown, and from them to the entire bearing surfaces of the disk. It will further be noted that by our improved construction the bearing disk is located on the top of the saddle and the means above described for limiting the movement of said bearing disk are between it and the saddle. This permits the key 11 to be inserted between the bearing disk and top of the box, the engagement of such key with the box being by plain flat surfaces and with the bearing disk being by spherically curved engaging surfaces which are continuous or devoid of any projections. This arrangement and construction enables the key to be drawn out or removed by a minimum jacking up of the car, and further enables said key to be withdrawn from the car bearing independently of the bearing disk and without disturbing or displacing said bearing disk in any way whatever. All the advantages of a separable and sliding bearing disk are thus secured by our invention without necessitating a key which is of unusual construction or arrangement and without requiring any special construction of box other than the standard make.

Wherever herein a part has been described as having a stem which enters a recess in an adjoining part, we wish it understood that said stem and recess could be reversed in their location if desired. Furthermore, it should be noted that the spaces which our improvement calls for between the different members of the bearing or their parts, facilitate the passage or transmission of oil throughout the entire bearing and thus conduce to its perfect lubrication.

Having thus described the invention, what we claim as new is:

1. In a car bearing, the combination with an axle journal and a box inclosing said journal, of a saddle fitting at its under side the said journal and having a plane upper surface, a separable bearing disk having a flat under surface slidably engaging said plane surface of the saddle and having a spherically rounded top, coöperating means upon the saddle and bearing disk for limiting their relative sliding upon said engaging surfaces, and a key between the said bearing disk and the box having at its bottom a spherically concave seat for the rounded top of the bearing disk and at its top a flat surface adapted to lie against the top of the box, said spherical engaging surfaces of the key and bearing disk being continuous and devoid of projections, and the key having a handle projecting at the outer end of the axle and being removable from the bearing independently of and without displacing the bearing disk and saddle.

2. In a car bearing, the combination with an axle journal and a box inclosing said journal, of a saddle fitting at its under side the said journal and having a plane upper surface, a separable bearing disk having a flat under surface slidably engaging said plane surface of the saddle and having a spherically rounded top, one of said slidably engaging surfaces having a projection and the other a recess loosely receiving said projection and allowing a limited relative movement of the said slidable parts, and a key between the said bearing disk and the box having at its bottom a spherically concave seat for the rounded top of the bearing disk and at its top a flat surface adapted to lie against the top of the box, said spherical engaging surfaces of the key and bearing disk being continuous and devoid of projections, and the key having a handle projecting at the outer end of the axle and being removable from the bearing independently of and without displacing the bearing disk and saddle.

3. In a car bearing, the combination with an axle journal and a box inclosing said journal, of a saddle fitting at its under side the said journal and having a plane upper surface, a separable bearing disk having a flat under surface slidably engaging said plane surface of the saddle and having a spherically rounded top, one of said relatively slidable surfaces having in itself an oblong recess, a correspondingly shaped stem on the other slidable part projecting loosely into said recess and preventing complete relative rotation of the said slidable parts while permitting a limited relative movement of them, and a key between the said bearing disk and the box having at its bottom a spherically concave seat for the rounded top of the bearing disk and at its top a flat surface adapted to lie against the top of the box, said spherical engaging surfaces of the key and bearing disk being continuous and devoid of projections, and the key having a handle projecting at the outer end of the axle and being removable from the bearing independently of and without displacing the bearing disk and saddle.

JACKSON R. BAKER.
MENZO LOUCKS.
WILLIAM R. CLARK.

Witnesses:
   RUSSELL M. EVERETT,
   ETHEL B. REED.